(12) United States Patent
Shmouel

(10) Patent No.: US 10,901,101 B2
(45) Date of Patent: Jan. 26, 2021

(54) SYSTEM FOR DETECTION AND LOCATION OF PENETRATION SYSTEM FOR DETECTION AND LOCATION OF PENETRATION

(71) Applicant: Shlomo Shmouel, Ashkelon (IL)

(72) Inventor: Shlomo Shmouel, Ashkelon (IL)

( * ) Notice: Subject to any disclaimer, the term of this patent is extended or adjusted under 35 U.S.C. 154(b) by 120 days.

(21) Appl. No.: 15/579,404

(22) PCT Filed: Jun. 5, 2016

(86) PCT No.: PCT/IL2016/050577
§ 371 (c)(1),
(2) Date: Dec. 4, 2017

(87) PCT Pub. No.: WO2017/013639
PCT Pub. Date: Jan. 26, 2017

(65) Prior Publication Data
US 2018/0143333 A1    May 24, 2018

(30) Foreign Application Priority Data
Jul. 19, 2015   (IL) ........................................ 240013

(51) Int. Cl.
*G08B 29/18*   (2006.01)
*G08B 13/00*   (2006.01)
*G01V 1/00*    (2006.01)

(52) U.S. Cl.
CPC ............. *G01V 1/001* (2013.01); *G08B 13/00* (2013.01); *G08B 29/18* (2013.01)

(58) Field of Classification Search
CPC ......... G08B 13/00; G08B 29/18; G01V 1/001
(Continued)

(56) References Cited

U.S. PATENT DOCUMENTS 4,295,092 A * 10/1981 Okamura ............... G01N 17/00
324/611
6,079,273 A *  6/2000 Latimer ............. G01N 29/2412
73/622
(Continued)

FOREIGN PATENT DOCUMENTS

CN    201738636 U    2/2011
KR    100609657 B1   7/2006
WO    2009014304 A1  1/2009

OTHER PUBLICATIONS

Protecting Secure Facilities From Underground Intrusion Using Seismic/Acoustic Sensor Arrays Army Maneuver Support Center Fort Leonard Wood MO Aug. 31, 2009 (Aug. 31, 2009).
(Continued)

*Primary Examiner* — Jacques M Saint Surin
(74) *Attorney, Agent, or Firm* — The Roy Gross Law Firm, LLC; Roy Gross

(57) ABSTRACT

A system for the detection and location for preventing underground infiltration and enable the timely discovery of tunnels and a rapid response is presented. It can therefore prevent prison escapes, attempts to infiltrate security facilities and others which must be protected. The system consists of a network of large-diameter adjacent pipes (1-4 meters, as required) buried underground either vertically or horizontally Inside each pipe there are sensors capable of detecting any foreign body entering the space. The sensors from all the pipes are connected to a control center to provide an immediate information on the location. The upper side of each of pipe has a lid that can be opened to check the source of the alarm and introduce personnel and equipment to handle the infiltrator.

17 Claims, 4 Drawing Sheets

(58) Field of Classification Search
USPC .......................................................... 73/646
See application file for complete search history.

(56) References Cited

U.S. PATENT DOCUMENTS

| | | | | |
|---|---|---|---|---|
| 6,125,703 | A * | 10/2000 | MacLauchlan | .... G01N 29/0609 |
| | | | | 73/592 |
| 6,731,210 | B2 | 5/2004 | Swanson et al. | |
| 7,172,371 | B2 | 2/2007 | Nickelson et al. | |
| 7,616,115 | B2 | 11/2009 | Horak et al. | |
| 8,387,444 | B2 * | 3/2013 | Le | ...................... G01N 27/9046 |
| | | | | 73/112.02 |
| 2008/0210852 | A1 * | 9/2008 | Browning | ............ G08B 13/124 |
| | | | | 250/227.14 |
| 2011/0250021 | A1 | 10/2011 | Aviram | |

OTHER PUBLICATIONS

Utilizing seismic/acoustic sensors to protect secure facilities from underground intrusion Engineer Research and Development Center Vicksburg MS Dec. 31, 2008 (Dec. 31, 2008).
International Search Report PCT/IL2016/050577 completed Sep. 4, 2016; dated Sep. 12, 2016 6 pages.
Written Opinion of the International Searching Authority PCT/IL2016/050577 dated Sep. 12, 2016 6 pages.

* cited by examiner

SYSTEM FOR DETECTION AND LOCATION OF PENETRATION SYSTEM FOR DETECTION AND LOCATION OF PENETRATION

RELATED APPLICATIONS

This application is a National Phase of PCT Patent Application No. PCT/IL2016/050577 having International filing date of Jun. 5, 2016, which claims the benefit of priority of Israel Application No. 240013 filed on Jul. 19, 2015 entitled SYSTEM FOR DETECTION AND LOCATION OF UNDERGROUND PENETRATION. The contents of the above applications are all incorporated by reference as if fully set forth herein in their entirety.

TECHNICAL FIELD

The invention deals in general with warning systems and focuses on protection against underground penetration.

BACKGROUND ART

Penetration of protected areas and flight from protected areas are constant threats. Such threats are greater when the opponent is able to invest considerable efforts in achieving their goal. This is the case with people trying to break into bank vaults, or to escape from high security prison, or with illegal migrants seeking to enter countries or terrorists trying to cross borders in order to carry out attacks. The problem is particularly severe when the attempt to penetrate or flee uses tunnels excavated tens of meters below the surface.

Since the result of any such penetration or flight may be disastrous, there is a need for a reliable system for prevention.

Various means have been developed to detect underground penetration. One method is to deploy sensitive shock sensors along the line to be blocked. These sensors indicate any underground activity, but they have a very high rate of false alarms. With all such systems the question of verification is complex. In addition, there is no physical obstacle to stop or delay the infiltrators. There are other patents that describe the construction of underground walls, of metal, concrete or a combination thereof, together with sensors to detect underground movement. For example, along the Egyptian-Gaza Strip border there is an underground barrier of steel plates buried deep below the surface. Although attempts to cut the plates will be detected by the sensors, once the plates are breached the infiltrators will be able to pass through, and it will take time to repair.

Currently existing technologies do not meet the needs, including for reliable detection without false alarms, a physical block, the ability to verify and deal with the penetration quickly, and the ability to upgrade—increase the depth—of the blockage, when infiltrators are able to build tunnels at greater depths.

SUMMARY OF INVENTION

The detection and location system is intended to prevent underground infiltration and enable the timely discovery of tunnels and a rapid response. It can therefore prevent prison escapes, attempts to infiltrate security facilities and others which must be protected.

The system consists of a network of large-diameter adjacent pipes (1-4 meters, as required) buried underground either vertically or horizontally. Each pipe may consist of several connected segments to achieve the required height. The bottom of the lowest segment is closed. The pipes can be made of metal, cement or any other suitable material. They pipes may be connected to each other or they may be spaced so that a person cannot pass through this space, thus creating a blocking wall. Inside each pipe there are volume and motion sensors capable of detecting any foreign body entering the space. It is also possible to install shock sensors to detect any attempt at penetrating the pipe. If the first side of the pipe (forming the wall) is breached, the sensors will immediately send an alarm signal to the operations center and forces can be dispatched while the would-be infiltrator is still trying to breach the second side. The sensors from all the pipes are connected to a control center to provide an immediate information on the location. The upper side of each of pipe has a lid that can be opened to check the source of the alarm and introduce personnel and equipment to handle the infiltrator(s).

The system detects penetration attempts without false warnings, since the detection area (inside the pipe) is free of any external nuisances. The top lid facilitates rapid verification of the alarm and response to the breach. Moreover, any breach can be easily repaired and the system restored to full operation. Another important feature is the ability to increase the depth of the blocking wall by adding pipe segments of smaller diameter than the original pipes.

It is also important to note that a similar method can be used to build a horizontal defensive wall. Such a wall can provide high security for bank vaults, prison cells and strategic facilities.

DETAILED DESCRIPTION

Figure 1:
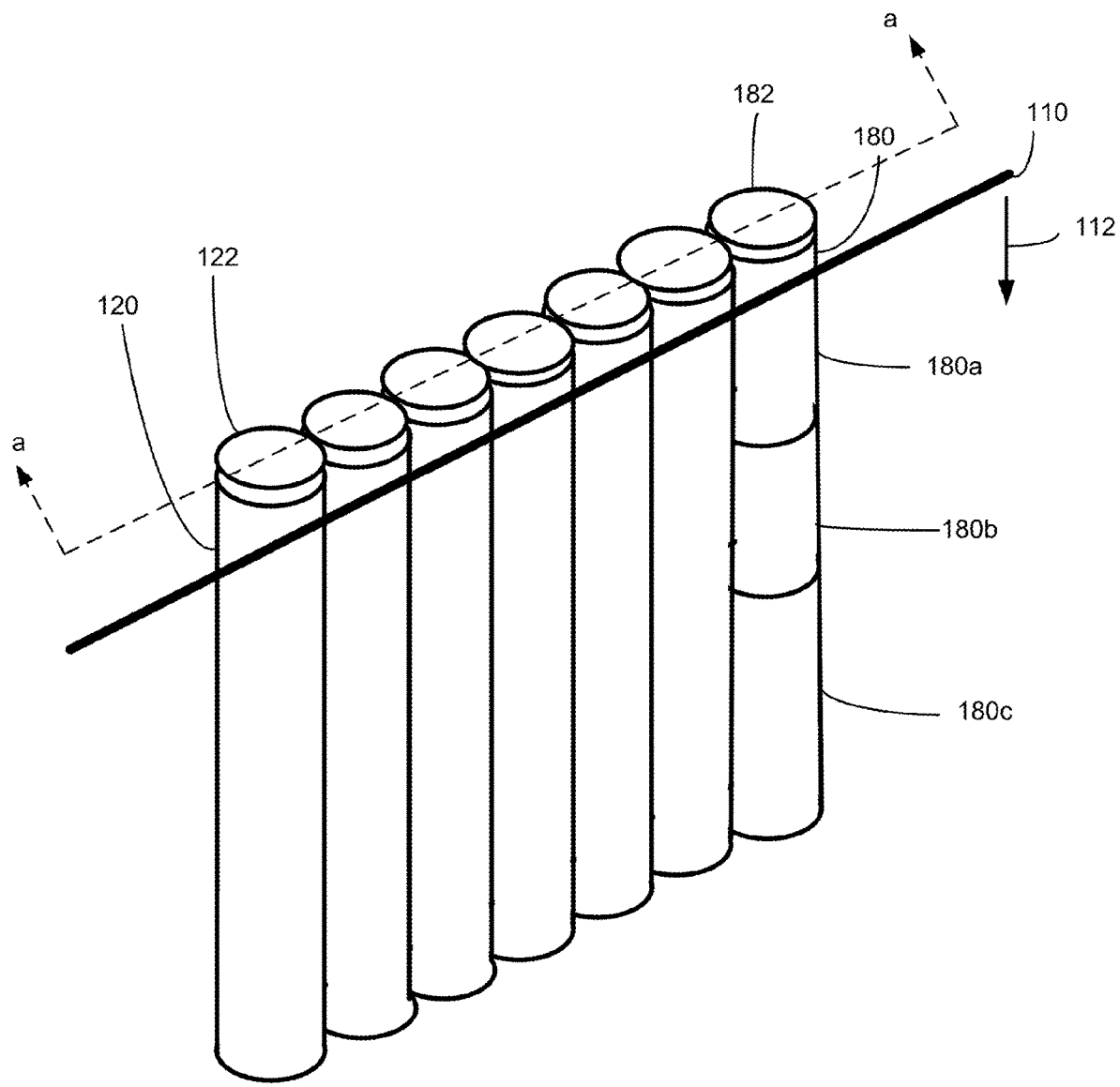
FIG. 1 presents a schematic plan of the underground blocking wall.
Figure 2:
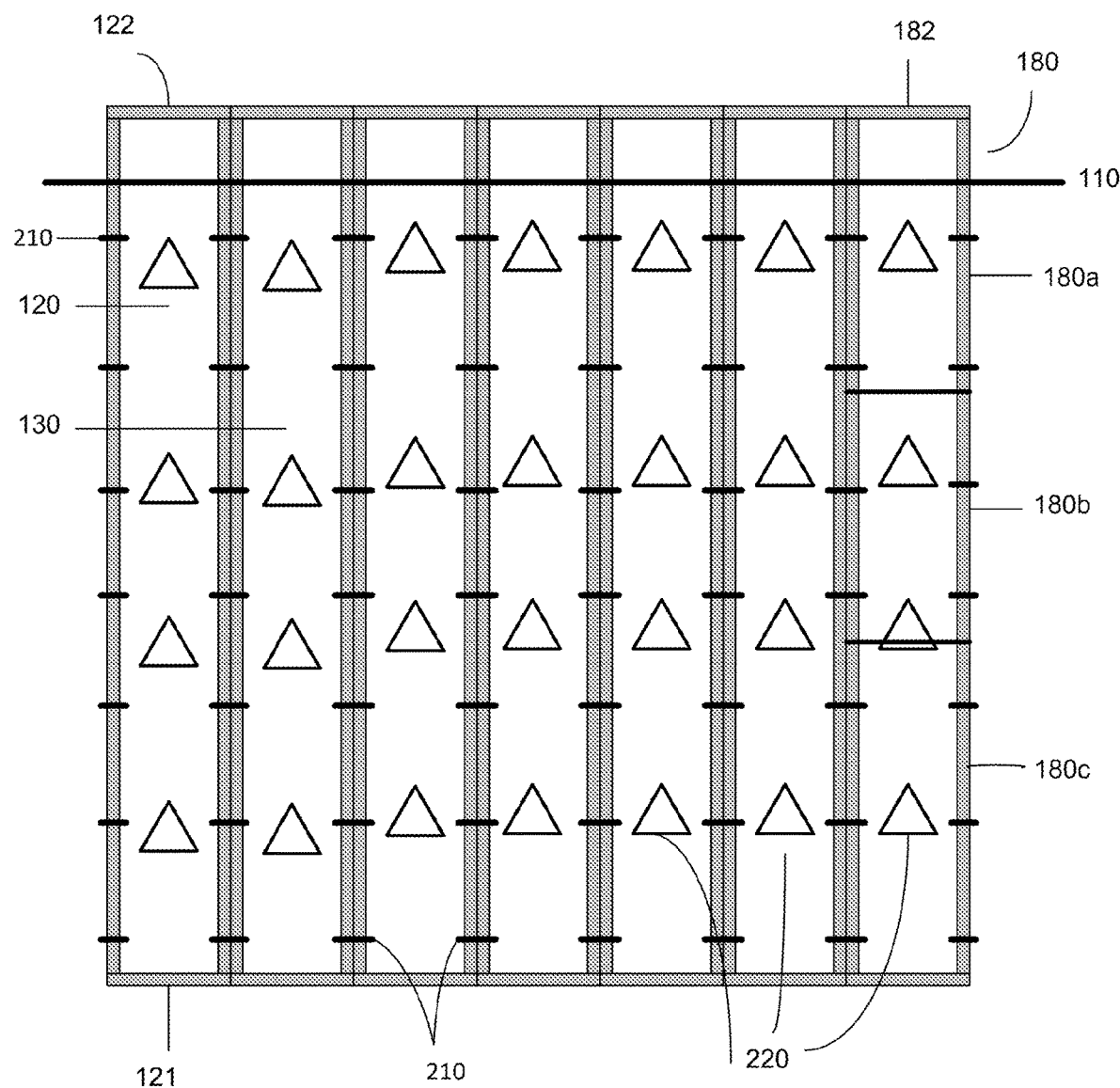
FIG. 2 illustrates section A-A through 3 pipes of the underground blocking wall.
Figure 3:
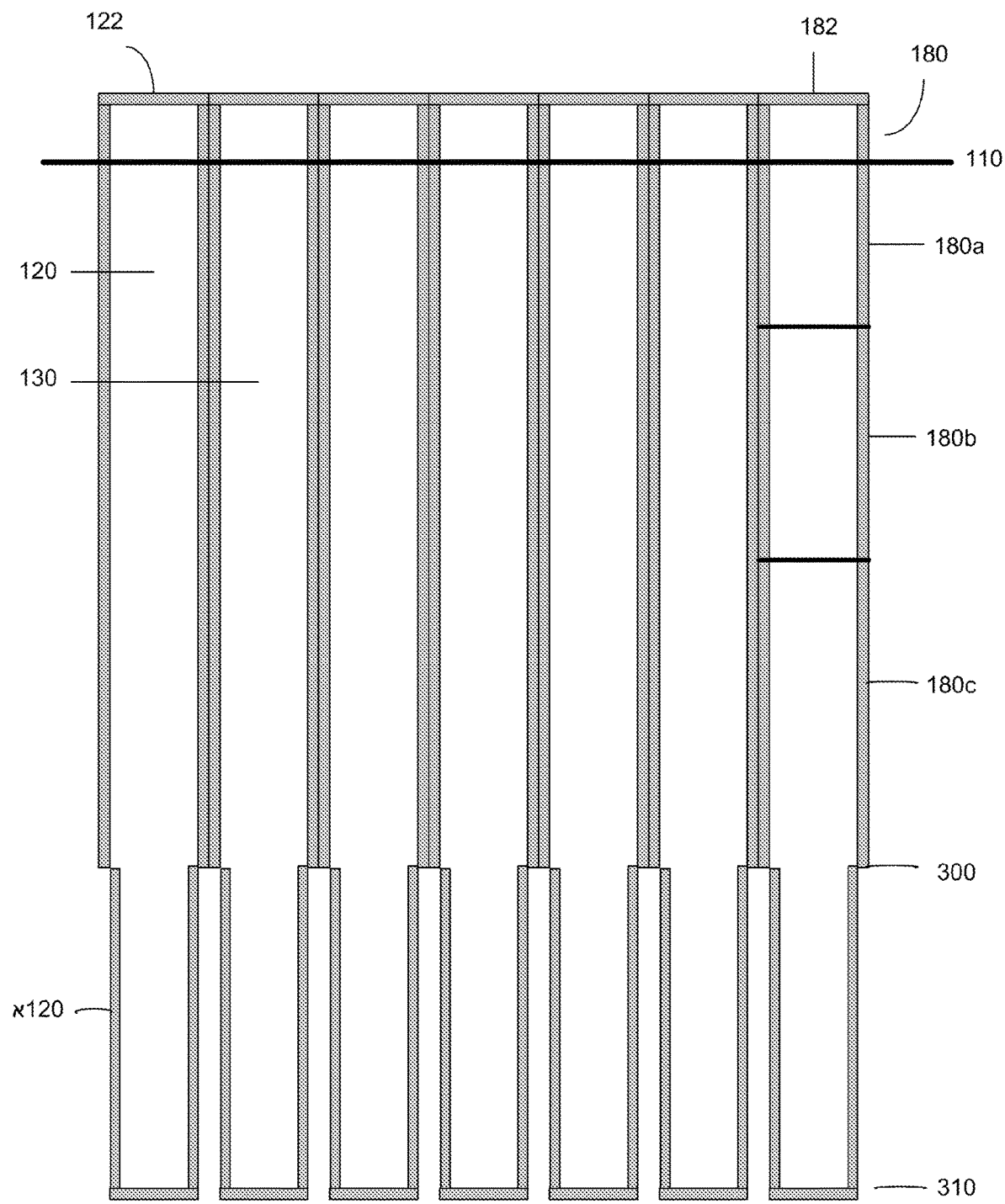
FIG. 3 shows a section of the wall describing how its depth can be increased.
Figure 4:
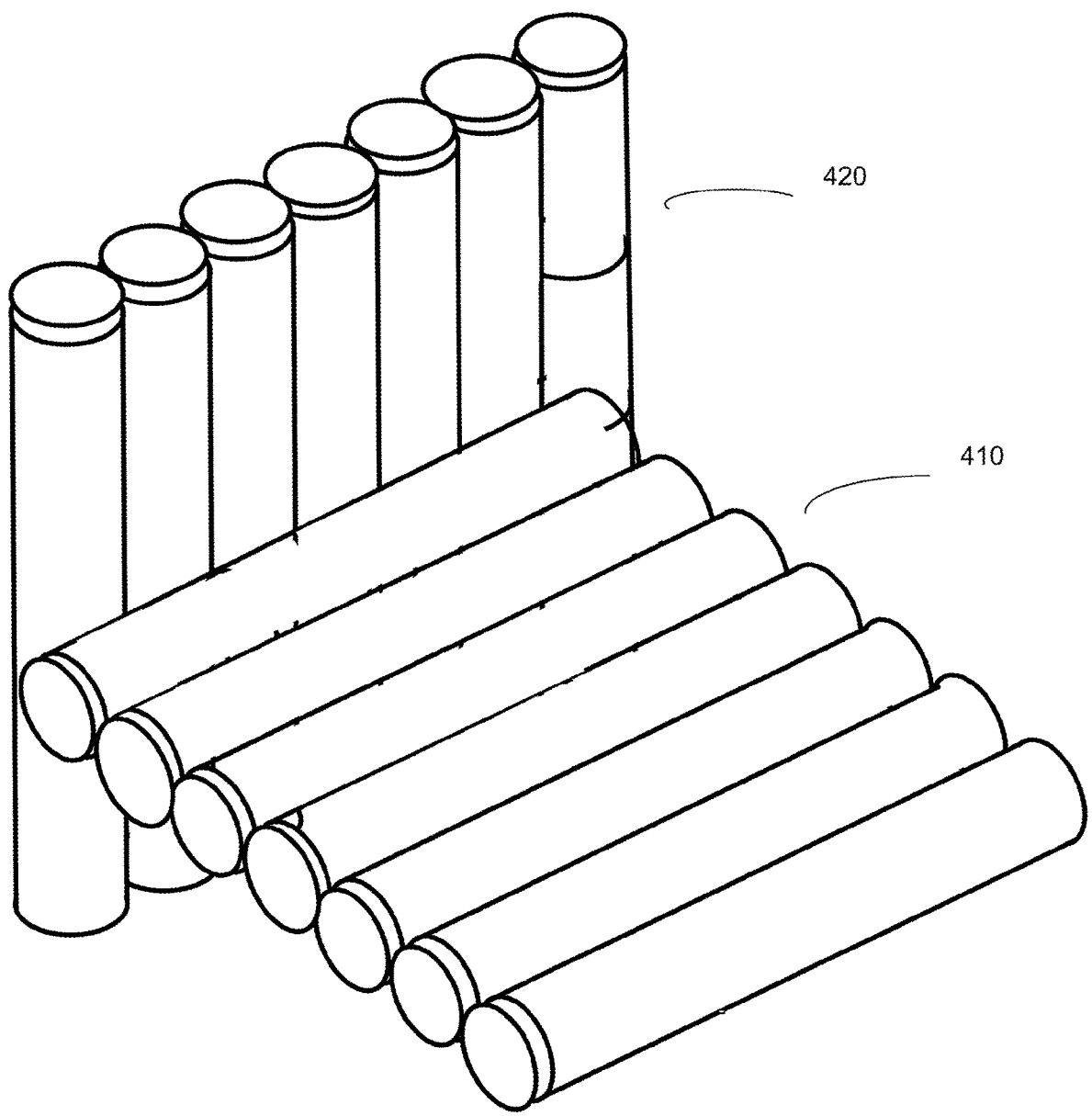
FIG. 4 illustrates combination of horizontal and vertical blocking wall.

Below is a detailed description of the invention in question, with reference to the attached drawings showing one possible implementation of the invention. It should be noted that the invention can be implemented in various ways, and the following description should not be deemed to restrict the options for implementation. On the contrary, the following implementation gives a full and detailed discovery of the invention and clarifies its scope for professionals in this field The blocking wall used to detect and locate penetration Is henceforth called the underground wall. Drawing 1 shows the principle of the underground wall. The underground wall is built of pipis 120 inserted into the ground next to each other. The depth of insertion, and therefore the depth of the wall, is determined by specific local requirements. The pipes may be of metal, concrete or any other suitable material. The pipe diameter is determined by needs, usually between one and four meters. The pipe inserted into the ground can be made of one unit, like Pipe 120 in Drawing 1, or can be constructed of several linked pipe segments, like pipe 180 in Drawing 1, which consists of 3 linked segments, 180a, 180b and 180c. Line 110 in Drawing 1 indicates ground level. Arrow 112 in Drawing 1 shows the direction into the ground. At the top of each pipe is a lid that can be opened, thus pipe 120 has Lid 122, and Pipe 180 has Lid 182. The purpose of the lid is to enable inspection of the interior pipe space if there is a suspected penetration. The opening also enables handling the penetration. Within the pipe space there are sensors that can distinguish any foreign body entering the space. Signals from the sensors are sent to a control room that reports any suspicious activity and the location from where the warning is sent, including the sensor's height. There can also be sensors that give early warning of any attempt at penetration, before the pipe is breached (vibration sensors).

Drawing 2 shows Section A-A of the underground wall described in Drawing 1. The pipes can be joined together. At the lower end of each pipe there is a lid-121 for Pipe 120. This ensures that the pipe is secured against false alarms. Along each pipe there are sensors, 220, covering the whole interior space. As stated, the sensors may be of various types—volume sensors, acoustic sensors, shock sensors etc. Since the pipe is sealed, the sensors are not exposed to external disturbances that could be interpreted as indicating penetration attempts, so there is no risk of false alarms. In addition, any false alarm due to a sensor malfunction can be easily verified. Forces arrive at the location of the alarm, remove the pipe lid and can then verify the situation and handle any penetration in the case of a genuine alarm.

Drawing 3 presents across section of the wall after greater depth has been added. The original wall was built to the required depth—marked by 300. If the need arises for greater depth, drilling takes place according to the internal diameter of the original pipe, and pipe segments with a smaller internal diameter are inserted 120.a to the new required depth—310. All the means of detection are inserted into the additional pipes. The result is a deeper wall achieved without damaging the original wall's structure.

In accordance with the invention described above, it is also possible to build an horizontal barrier as shown in Drawing 4. In this drawing an horizontal barrier 410 is next to a underground vertical wall 420. Such a wall can provide protection against infiltration of protected areas such as bank vaults, high security prison cells, or even important strategic facilities. It is important to note that the vertical wall can be partly underground and partly over ground, while the horizontal wall is completely underground.

The explanations given above do not cover all the possible implementations of the invention. Their purpose is to clarify the main points and principles, with examples of possible uses. From these descriptions and explanations, a professional in the field will be able to use the invention in various ways and construct walls for a range of protection needs, adapted to the surrounding conditions, and incorporating various types of sensors.

The invention claimed is:

1. A system for detection and location of underground human penetration through tunnels, system consisting of the following elements:
   a vertical wall constructed of two or more hollow pipes inserted vertically into the ground, and placed next to each other, not touching each other, spaced so that a human being cannot pass through the space between the hollow pipe;
   a removable lid on the top of each pipe used for entering the pipe for alarm verification and for handling the infiltration;
   plurality of sensors installed in each pipe that are configured to detect the presence of an infiltrator within its space or human infiltration activity near its surface; and
   a control unit that analyzes signals from the sensors and provides information about the detection location.

2. A system for detection and location of underground penetration as described in claim 1, where the pipes configured to made of metal, concrete or any other suitable material.

3. A system for detection and location of underground penetration as described in claim 1, where the side of the pipes facing the direction of penetration is fitted with vibration sensors.

4. A system for detection and location of underground penetration as described in claim 1, where at least one sensor is an acoustic sensor.

5. A system for detection and location of underground penetration as described in claim 1, where at least one sensor is a volume sensor.

6. A system for detection and location of underground penetration as described in claim 1, where the depth of the vertical wall is increased by inserting additional pipes having smaller diameters than the existing pipes through the existing pipes with additional sensors.

7. A system for detection and location of underground human penetration consisting of the following elements:
   horizontal barrier constructed of two or more hollow pipes inserted horizontally into the ground, and placed next to each other, not touching each other, where the pipes are spaced so that a human being cannot pass through the space between the pipes, and each pipe is closed at both ends;
   plurality of sensors installed in each pipe that are configured to detect the presence of an infiltrator within its space or human infiltration activity near its surface, and
   a control unit that analyzes signals from the sensors and provides information about the detection location.

8. A system for detection and location of underground penetration as described in claim 7, where the pipes configured to made of metal, concrete or suitable plastic materials.

9. A system for detection and location of underground penetration as described in claim 7, where the side of the pipes facing the direction of penetration is fitted with vibration sensors.

10. A system for detection and location of underground penetration as described in claim 7, where at least one sensor is an acoustic sensor.

11. A system for detection and location of underground penetration as described in claim 7, where at least one sensor is a volume sensor.

12. A system for detection and location of underground penetration as described in claim 1 and claim 7 where the vertical wall and the horizontal barrier are close to each other so that a human being cannot pass between them.

13. A system for detection and location of above ground human penetration, the system is comprised of the following elements:
   vertical wall constructed of two or more hollow pipes placed next to each other above ground, not touching each other, spaced so that a human being cannot pass through the space between the hollow pipes;
   plurality of sensors installed in each pipe that are configured to detect the presence of an infiltrator within its space or human infiltration activity near its surface; and
   control unit that analyzes signals from the sensors and provides information about the detection location.

14. A system for detection and location of above ground human penetration as described in claim 13, where the pipes configured to made of metal, concrete or any other suitable material.

15. A system for detection and location of above ground human penetration as described in claim 13, where the side of the pipes facing the direction of penetration is fitted with vibration sensors.

16. A system for the detection and location of above ground human penetration as described in claim 13, where at least one sensor is an acoustic sensor.

17. A system for detection and location of above ground human penetration as described in claim 13, where at least one sensor is a volume sensor.

* * * * *